United States Patent Office 2,841,923
Patented July 8, 1958

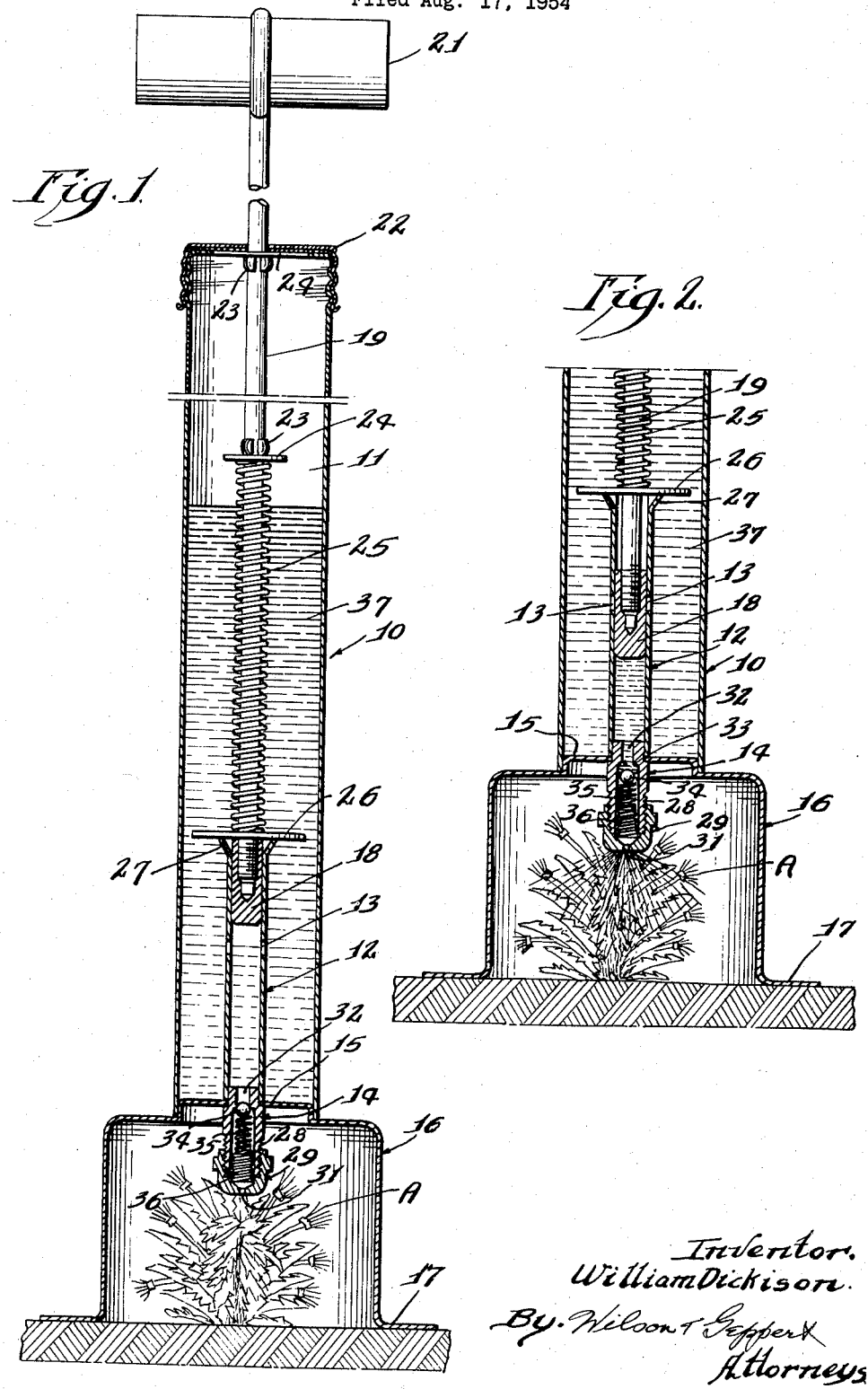

2,841,923

SPRAYING DEVICE

William Dickison, Des Plaines, Ill., assignor to H. D. Hudson Manufacturing Company, Chicago, Ill., a corporation of Minnesota Application August 17, 1954, Serial No. 450,373

9 Claims. (Cl. 47—1)

The present invention relates to a spraying device and especially to a novel means and mechanism for destroying weeds, crab grass and other plants or plant life by a confined liquid or spray solution destructive to such plant life.

It is an important object of the present invention to provide a novel sprayer for destroying weeds or other plant life having means for enclosing or confining or isolating the weed or plant life to be destroyed and novel means for discharging a spray solution into said confined space in a controlled spray pattern.

Another object of the present invention is to provide in a spraying device a novel means for discharging a liquid in novel spray pattern, said means including a threaded insert loosely mounted in the discharge passage for the liquid under pressure, and giving a spinning action to the insert whereby the liquid from the discharge orifice is given a substantially cone-shaped spray pattern.

The present invention further comprehends the provision of a novel spraying device having an inverted cup-shaped member adapted to isolate or confine the weed or plant to be destroyed and a novel means and manner of supplying a limited quantity of a spray solution thereto in a novel manner for most effective application of this spray solution.

Another important object of the present invention is the provision of a novel spray assembly having a barrel providing a reservoir for a substantial quantity of a liquid spray, a cylinder within the barrel of substantially smaller size and adapted to be automatically supplied with the liquid spray from the barrel through one or more ports, a plunger in said cylinder which in inoperative position uncovers said ports to permit the automatic filling of the cylinder with the liquid spray, a valve assembly associated with said cylinder and provided with a valve adapted to be opened by the pressure of the liquid spray in the cylinder when the plunger is depressed and the ports are closed, and a novel spiral insert loosely mounted in the valve body in the path of the liquid spray from the cylinder for controlling the flow pattern of the discharged spray.

A further important object of the present invention is to provide in a sprayer of the type disclosed, a novel means and mechanism for discharging in a novel manner and spray pattern a limited quantity of a liquid spray upon each stroke of the plunger.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a view in vertical cross section through the novel spraying device, the view showing the component parts in inoperative position.

Fig. 2 is a fragmentary view in vertical cross section of the spraying device but showing only the lower portion thereof with the plunger being depressed and the valve opened for spraying.

Referring more particularly to the detailed disclosure in the drawing and to the novel illustrative embodiment therein shown, the novel spraying device comprises a pump barrel 10 providing a reservoir 11 for a spray solution. Within this barrel and shown as disposed substantially centrally of the barrel is a cylinder or tubular part 12 having one or more ports or openings 13 intermediate its length for the passage of the contained spray solution into the cylinder or tubular part 12 from the reservoir 11.

The lower end of the cylinder or tubular part 12 is press-fitted or otherwise fixedly mounted upon the upper reduced end of a valve body 14, the latter being secured in an end plate or head 15 of an inverted cup-shaped member 16 adapted to be held or located over a weed, crab grass or other plant or plant life A that is intended to be destroyed. This cup-shaped member 16 is of a size to enclose or confine therein the weed or other plant to be destroyed, and includes a peripheral or circumferential, outwardly projecting flange 17 adapted to be seated upon the ground surrounding the weed or plant and isolate the latter from the surrounding vegetation, thereby confining and localizing the discharged spray and assuring most effective application of the spray solution.

In the hydraulic cylinder or tubular part 12 is conformably received a plunger 18 connected or threaded to the lower end of a pump rod 19 actuated by means of a handle 21 mounted on the upper, external end of the rod. This rod projects through an opening in a threaded or detachable cap or closure 22 at the upper end of the barrel 10. Mounted upon or affixed to the pump rod 19 by spaced depending clamping fingers 23 is a transverse plate or disc 24 providing a stop limiting the distance to which the rod may be withdrawn. A similar transverse plate or disc 24 is mounted or affixed to the rod 19 by its spaced outstanding clamping fingers or prongs 23, the latter transverse plate or disc providing an abutment against which the upper end of a coil or compression spring 25 seats.

This spring 25 encompasses the pump rod 19 with its lower end seating upon or bearing against a transverse plate or disc 26 shown as of substantially greater diameter than the discs 24 but substantially less than the interior of the barrel. The transverse plate or disc 26 is free of the pump rod 19 and is shown as seating upon the upper, outwardly flared end 27 of the cylinder or tubular part 12, whereby the spring 25 is placed under compression whenever the pump rod 19 and its plunger 18 are lowered or depressed by the operator. The upper plate or disc 24 provides a stop that maintains the plunger 18 in the hydraulic cylinder or tubular part 12.

The nozzle includes the hollow valve body 14 of generally cylindrical shape having its lower end 28 externally threaded to receive an internally threaded cap or nozzle 29 provided with a discharge orifice 31. Within the bore or longitudinal opening 32 of the valve body adjacent its upper end there is provided a tapered valve seat 33 adapted to be closed by a valve member 34 shown in the form of a ball and spring-biased to closed position or valve seating engagement by a coil spring 35.

The upper end of the coil spring 35 seats against the ball 34 and the lower end of this spring seats upon the upper end of an exteriorly threaded insert 36 which is loosely received and free to rotate in the smooth cylindrical bore or interior of the valve body 14 and held within the valve body by the cap or nozzle 29 but in spaced relation with its orifice 31. The insert 36 being solid and provided with a helical thread or groove on its exterior surface, is given a spinning action by the liquid or spray solution under pressure as this liquid is forced through the bore or longitudinal passage 32 in the valve body by the plunger 18. This spinning action causes the liquid as it leaves the orifice 31 to be discharged in a cone-shaped pattern which is directed downwardly upon the weed, crab grass or other plant to be destroyed.

Liquid or spray solution 37 capable of destroying weeds, crab grass, or other plant life, is supplied to the reservoir 11 of the barrel 10 by removal of a threaded cap or closure 22, and this reservoir is adapted to contain a quantity of liquid sufficient to repeatedly refill the chamber in the cylinder 12.

Fig. 1 discloses the handle 21, the plunger 18 and the plunger rod 19 retracted and the ball 34 of the valve assembly seated in closed position. In this position, the plunger 18 is located above the openings or ports 13 in the cylinder or tubular part 12, and the spray solution from the reservoir 11 of the barrel is free to flow through the ports 13 into the cylinder or tubular part 12. With the cylinder or tubular part 12 filled with the liquid or spray solution 37 for destroying the intended weed, crab grass or other plant and the parts assembled in the manner shown in Fig. 1, depressing the handle 21 and the plunger rod 19 as shown in Fig. 2, depresses or lowers the plunger 18 and causes hydraulic pressure of the liquid or spray solution to unseat the ball 34 and cause the spray solution to be discharged in a cone-shaped pattern from the orifice 31.

Thus when the cup-shaped member 16 is placed over a weed or other plant life to be destroyed and in contact with the ground, pressure exerted on the handle 21 will compress the spring 25 and lower the plunger 18. As the plunger is lowered, it closes the ports or openings 13 in the cylinder 12 whereupon hydraulic pressure of the entrapped liquid or spray solution in the cylinder unseats the ball or valve member 34 and compresses the spring 35. Liquid or spray solution flowing through the bore or passage 32 in the valve body 14 is forced through the helical groove defined by the theaded insert 36 and the encompassing interior of the valve body which creates a spinning action.

The liquid or spray solution discharged from this helical groove issues from the orifice in a substantially cone-shaped pattern of relatively coarse and fine drops. The amount of liquid discharged for each complete or full stroke of the plunger is limited to the quantity in the cylinder 12 between the ports 13 and the ball valve 34.

As the operator releases the pressure on the handle 21, the plunger 18 is elevated to its raised or inoperative position by the coil spring 25, and the ball or valve 34 is elevated by its coil spring 35 into seating engagement with the valve seat 33 thereby preventing further flow of liquid. In this elevated position of the plunger 18, the ports 13 are uncovered to permit uninterrupted flow into the cylinder 12 of liquid from the reservoir 11 until the cylinder is filled to the proper level.

Having thus disclosed the invention, I claim:

1. A spraying device for destroying weeds and other plant life, comprising a barrel providing a reservoir for a substantial quantity of a spray solution, a cylinder mounted in said barrel and having one or more inlet ports for the passage of a limited quantity of spray solution from the reservoir into the cylinder, a plunger received in one end of said cylinder and longitudinally movable therein, means for spring-biasing said plunger to inoperative position, a rod connected to one end of the plunger and projecting through one end of the barrel and thereat provided with a handle for depressing the rod and plunger against the force of said spring, a valve body and nozzle assembly at the other end of the cylinder, a spring-pressed valve in the passage of said valve body adapted to be unseated when the plunger is depressed and moved into the cylinder for forcing liquid under pressure through the valve body, an insert loose in said body and provided with a helical groove whereby said insert is given a spinning action by the liquid under pressure flowing through said passage toward the nozzle, and an inverted cup-shaped receptacle at the other end of the barrel encompassing the nozzle and adapted to isolate a weed to be destroyed from surrounding vegetation.

2. A spraying device for destroying weeds and other plant life, comprising a barrel providing a reservoir for a substantial quantity of a spray solution, a cylinder mounted in said barrel and having one or more inlet ports in its wall for the passage therethrough of a limited quantity of spray solution from the reservoir into the cylinder, a plunger entering one end of and movable longitudinally in said cylinder and which when depressed forces spray solution from said cylinder and when released is spring-biased to inoperative position, a valve body at the other end of the cylinder and provided with a passage therethrough for receiving flow from the cylinder, valve means in said valve body for controlling the flow of spray solution through said passage when the plunger is depressed and hydraulic pressure of the confined spray solution in the cylinder unseats said valve, a nozzle having a discharge orifice, and means in the path of said spray solution flowing through the passage of the valve body for causing the spray solution discharged through said orifice to issue in a cone-shaped pattern, said means including an insert in the valve body and provided with a single, continuous helical groove on its exterior whereby the liquid under pressure flowing through said passage toward said orifice is discharged through said groove and given a spinning action.

3. A spraying device for destroying weeds and other plant life, comprising a barrel providing a reservoir for a substantial quantity of a spray solution, a cylinder in said barrel and having one or more inlet ports in its wall for the passage therethrough of a limited quanity of spray solution from the reservoir into the cylinder, a solid plunger entering one end of and movable longitudinally in said cylinder and which when depressed forces spray solution from said cylinder and when released is spring-biased to inoperative position, a valve body at the other end of the cylinder and provided with a passage therethrough for receiving flow from the cylinder, valve means in said valve body for controlling the flow of spray solution through said passage when the plunger is depressed and hydraulic pressure of the confined spray solution in the cylinder unseats said valve, a nozzle having a discharge orifice, a member in the valve body in the path of said spray solution flowing through the passage of the valve body and having a single, continuous groove on its exterior for causing the spray solution discharged through said orifice to issue in a cone-shaped pattern, and an inverted cup-shaped receptacle at one end of the barrel encompassing the nozzle and adapted to isolate a weed to be destroyed from surrounding vegetation.

4. In a spraying device for destroying weeds and other undesirable plant life, an inverted cup-shaped receptacle adapted to be placed over and cover the weed to be destroyed, a barrel providing a reservoir for a substantial quantity of a liquid to be sprayed for destroying the weed, a cylinder in said barrel for receiving a limited quantity of the liquid from the barrel, a plunger in one end of said cylinder, a valve body at the other end of said cylinder and provided with a liquid passage therethrough and a valve seat, a valve in said valve body and adapted to be opened for the flow of liquid under pressure through said passage when the plunger is actuated, a nozzle having an orifice for discharge of the liquid under pressure, and an insert loose in the passage in said valve body adjacent the nozzle and provided with a single, continuous helical groove on its exterior for controlling the pattern of spray discharged from the nozzle.

5. In a spraying device for destroying weeds and other undesirable plant life, an inverted cup-shaped receptacle adapted to be placed over and cover the weed to be destroyed, a barrel providing a reservoir for a substantial quantity of a liquid to be sprayed for destroying the weed, a cylinder in said barrel for receiving a limited quantity of the liquid from the barrel, a plunger in one end of said cylinder, a valve body at the other end of the cylinder and provided with a liquid passage and a valve seat, a valve in said valve body and adapted to be unseated to permit the flow of liquid under pressure through the passage in the valve body when the plunger is actuated, a nozzle disposed within the receptacle and having an orifice for discharge of the liquid under pressure, and an insert loose within the passage in the valve body and provided with a single, continuous thread on its exterior for giving a spinning action to the flow of liquid through said passage to cause discharge of the liquid through the orifice in a cone-shaped spray pattern.

6. In a spraying device, a barrel providing a reservoir for a substantial quantity of a liquid, a cylinder for receiving from said barrel liquid to be sprayed and provided with one or more inlet ports intermediate its length for the entry of said liquid from said reservoir, a plunger in one end of said cylinder controlling passage of liquid from said barrel into said cylinder through said ports and uncovering said ports when the plunger is retracted in its upward stroke in said cylinder, a valve body at the other end of said cylinder and provided with a liquid passage therethrough and a valve seat, a valve in said valve body opened for the flow of liquid under pressure through said passage when the plunger is actuated in a downward direction, and to close at the beginning of the upward stroke when the plunger is retracted to facilitate the creation of a partial vacuum in the cylinder and insure the rapid flow of liquid into said cylinder, a nozzle at the lower end of the valve body having an orifice for discharge of the liquid under pressure, and a helically grooved insert loose in said valve body between said valve and orifice of the nozzle for giving a spinning action to the flow of liquid through said passage and controlling the pattern of spray discharge from the nozzle.

7. In a spraying device, a barrel providing a reservoir for a substantial quantity of liquid to be sprayed, a cylinder in and receiving liquid from said barrel and provided with one or more inlet ports, a plunger in the upper end of said cylinder controlling passage of liquid from the barrel into said cylinder through said ports and from said cylinder, a valve body at the lower end of the cylinder, said cylinder at its upper end being flared to guide and facilitate entry of said plunger into the cylinder during assembly, said valve body being provided with a liquid passage and a valve seat, a valve in said valve body adapted to be unseated to permit the flow of liquid under pressure through said passage when the plunger is actuated, a nozzle at the lower end of the valve body having an orifice for discharge of the liquid under pressure, and a helically grooved insert in the passage in the valve body between said valve and orifice for controlling the spray pattern from the nozzle.

8. In a spraying device, a barrel providing a reservoir for a substantial quantity of liquid to be sprayed, a cylinder in the lower portion of the barrel for receiving liquid from said barrel and provided with one or more inlet ports intermediate its ends, a plunger in one end of said cylinder and means on said end of the cylinder receiving the plunger for guiding and facilitating entry of said plunger into said cylinder during assembly, a valve body at the other end of the cylinder and provided with a liquid passage and a valve seat, a valve in said valve body adapted to be unseated to permit the flow of liquid under pressure through the passage in the valve body when the plunger is actuated in a downward direction with said downward movement of said plunger closing said ports, and the valve adapted to be seated when the plunger is actuated in an upward direction in time to prevent the passage of air through the nozzle into the cylinder, thus causing a partial vacuum to exist in the cylinder before the ports are opened at the top end of the plunger stroke and causing liquid to flow through said ports into the cylinder, a nozzle at the lower end of the valve body having an orifice for discharge of the liquid under pressure, and a helically threaded insert loose within the passage in the valve body and given a spinning action by the flow of liquid through said passage to cause discharge of the liquid through the orifice in a cone-shaped pattern.

9. A spraying device for destroying weeds and other plant life, comprising a barrel providing a reservoir for a substantial quantity of a spray solution, a cylinder mounted in and spaced from the interior of the said barrel and having one or more inlet ports intermediate the ends of the cylinder for the passage of a relatively small quantity of spray solution from the reservoir into the cylinder, a plunger in one end of said cylinder, said end of the cylinder receiving the plunger having means for guiding and centering the plunger in said cylinder upon assembly, a valve body at the other end of the cylinder and provided with a liquid passage and a valve seat, a valve in said body adapted to be unseated to permit flow of liquid under pressure through said passage when the plunger is actuated in the direction toward the valve seat and during which movement of said plunger the latter closes said ports, and adapted to be seated to prevent the flow of air through the nozzle, through the valve body and into the cylinder when the plunger is actuated in a direction away from the valve seat to cause a partial vacuum to exist in the cylinder before the inlet ports are opened, a nozzle connected to said valve body having an orifice for discharge of the liquid under pressure, and a helically grooved insert loose in the passage in the valve body between said valve and orifice for giving a spinning action to the flow of liquid through said passage and controlling the spray pattern from the nozzle.

References Cited in the file of this patent

UNITED STATES PATENTS

| 666,297 | Winkle | Jan. 22, 1901 |
| 1,174,905 | Seeger | Mar. 7, 1916 |
| 1,258,471 | Schlaepfer | Mar. 5, 1918 |
| 1,781,004 | Giezentanner | Nov. 11, 1930 |
| 1,865,914 | Jaden | July 5, 1932 |
| 1,868,235 | Jaden | July 19, 1932 |
| 1,959,102 | Hummel | May 15, 1934 |
| 2,124,580 | Lavine | July 26, 1938 |
| 2,557,246 | Ziherl | June 19, 1951 |
| 2,557,247 | Ziherl | June 19, 1951 |

FOREIGN PATENTS

| 70,052 | Austria | Sept. 25, 1915 |
| 20,283 | Australia | of 1934 |
| 562,329 | Germany | Oct. 24, 1932 |
| 1,939 | Great Britain | of 1912 |